US012589591B2

(12) United States Patent
Taniguchi et al.

(10) Patent No.: US 12,589,591 B2
(45) Date of Patent: Mar. 31, 2026

(54) LIQUID EJECTING HEAD AND LIQUID EJECTING APPARATUS

(71) Applicant: SEIKO EPSON CORPORATION, Tokyo (JP)

(72) Inventors: Manabu Taniguchi, Shiojiri (JP); Takanori Aimono, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 123 days.

(21) Appl. No.: 18/581,679

(22) Filed: Feb. 20, 2024

(65) Prior Publication Data

US 2024/0278568 A1 Aug. 22, 2024

(30) Foreign Application Priority Data

Feb. 21, 2023 (JP) ................................ 2023-024903

(51) Int. Cl.

*B41J 2/14* (2006.01)
*B41J 2/135* (2006.01)
*B41J 2/18* (2006.01)

(52) U.S. Cl.

CPC ............ *B41J 2/1433* (2013.01); *B41J 2/135* (2013.01); *B41J 2/14233* (2013.01); *B41J 2002/14306* (2013.01); *B41J 2002/14411* (2013.01); *B41J 2002/14419* (2013.01); *B41J 2002/14475* (2013.01); *B41J 2/18* (2013.01)

(58) Field of Classification Search

CPC ...... B41J 2/1433; B41J 2/135; B41J 2/14233; B41J 2/18; B41J 2002/14306; B41J 2002/14411; B41J 2002/14419

See application file for complete search history.

(56) References Cited

U.S. PATENT DOCUMENTS 8,282,194 B2 * 10/2012 Ozawa ................ B41J 2/14274 347/47
11,207,887 B2 * 12/2021 Taniuchi .................... B41J 2/14
2021/0237442 A1 8/2021 Naganuma

FOREIGN PATENT DOCUMENTS

JP 2021-119042 A 8/2021

* cited by examiner

*Primary Examiner* — Geoffrey S Mruk

(74) *Attorney, Agent, or Firm* — WORKMAN NYDEGGER

(57) ABSTRACT

A liquid ejecting head includes a plurality of nozzles arranged in a Y direction and ejecting liquid in a Z direction intersecting with the Y direction; and a plurality of nozzle flow passages each being continuous to corresponding one of the plurality of nozzles and extending in an X direction intersecting with the Y direction and with the Z direction, wherein each of the plurality of nozzles includes a first portion and a second portion, the second portion being located closer to the nozzle flow passage in the Z direction than the first portion is, capacity of the first portion is smaller than capacity of the second portion, and M2/M1<0.26, where M1 is inertance of the first portion, and M2 is inertance of the second portion.

13 Claims, 8 Drawing Sheets

LIQUID EJECTING HEAD AND LIQUID EJECTING APPARATUS

The present application is based on, and claims priority from JP Application Serial Number 2023-024903, filed Feb. 21, 2023, the disclosure of which is hereby incorporated by reference herein in its entirety.

BACKGROUND

1. Technical Field

The present disclosure relates to a liquid ejecting head and a liquid ejecting apparatus.

2. Related Art

For example, as disclosed in JP-A-2021-119042, the following liquid ejecting head is known. The liquid ejecting head has a structure in which liquid circulates through a nozzle flow passage and the liquid is ejected in a direction orthogonal to the nozzle flow passage. In such a liquid ejecting head, a two-tiered nozzle is sometimes used for the purpose of suppressing a satellite droplet and for the purpose of supplying liquid to the nozzle efficiently. The two-tiered nozzle includes a first portion and a second portion. A liquid droplet is ejected from the first portion. The second portion is continuous from the nozzle flow passage and continuous to the first portion. The second portion has capacity larger than that of the first portion. Moreover, a liquid ejecting head that includes, in addition to ordinary nozzles, micro nozzles for ejecting micro droplets are known.

When a two-tiered nozzle structure is applied to a micro nozzle, since the capacity of a first portion of the micro nozzle is relatively small, the liquid is prone to stagnate and, therefore, there is a risk that the viscosity of the liquid in the micro nozzle might increase. As the viscosity of the liquid increases, a failure to eject the liquid properly could occur more frequently. A technique that makes it possible to suppress an increase in the viscosity of the liquid at a nozzle to which a two-tiered nozzle structure is applied is demanded.

SUMMARY

The present disclosure can be embodied in the following mode, though not limited thereto.

In a certain mode of the present disclosure, a liquid ejecting head is provided. The liquid ejecting head includes: a plurality of nozzles arranged in a Y direction and ejecting liquid in a Z direction intersecting with the Y direction; and a plurality of nozzle flow passages each being continuous to corresponding one of the plurality of nozzles and extending in an X direction intersecting with the Y direction and with the Z direction, wherein each of the plurality of nozzles includes a first portion and a second portion, the second portion being located closer to the nozzle flow passage in the Z direction than the first portion is, capacity of the first portion is smaller than capacity of the second portion, and $M2/M1<0.26$, where M1 is inertance of the first portion, and M2 is inertance of the second portion.

DESCRIPTION OF EMBODIMENTS

A. First Embodiment

A1. Configuration of Liquid Ejecting Apparatus 100

Figure 1:
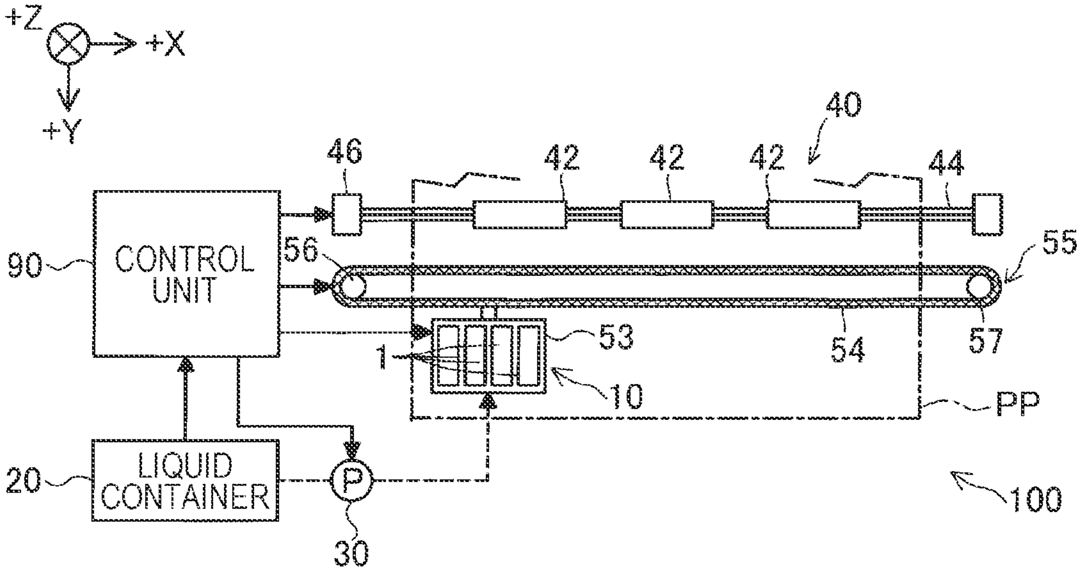
FIG. 1 is a diagram for explaining a schematic configuration of a liquid ejecting apparatus according to an embodiment of the present disclosure.

FIG. 1 is a diagram for explaining a schematic configuration of a liquid ejecting apparatus 100 according to an embodiment of the present disclosure. In the present embodiment, the liquid ejecting apparatus 100 is an ink-jet printer that forms an image by ejecting ink, which is an example of liquid, onto printing paper PP. The liquid ejecting apparatus 100 may eject ink to any of various kinds of a medium such as a resin film, a cloth, or the like in place of the printing paper PP. In FIG. 1, an X axis, a Y axis, and a Z axis, which are three axes orthogonal to one another, are illustrated. All of an X axis, a Y axis, and a Z axis that are illustrated in other drawings correspond to the X axis, the Y axis, and the Z axis of FIG. 1.

The liquid ejecting apparatus 100 includes a liquid ejecting head unit 10, a liquid container (s) 20, a circulation mechanism 30, a transportation mechanism 40, a movement mechanism 55, and a control unit 90.

The liquid ejecting head unit 10 is made up of at least one liquid ejecting head 1. The liquid ejecting head 1 includes many nozzles (nozzles N to be described later) and forms an image on the printing paper PP by ejecting ink in the −Z direction. A detailed configuration of the liquid ejecting head 1 will be described later. As the ink that is ejected, for example, ink of four colors in total such as black, cyan, magenta, and yellow may be ejected. The colors of the ink are not limited to the four colors mentioned above. Ink of any colors such as light cyan, light magenta, white, and/or the like may be ejected. The liquid ejecting heads 1 are mounted on a carriage 53 (to be described later) of the movement mechanism 55 and reciprocate in a main scanning direction together with the carriage 53. In the present embodiment, the main scanning direction includes the +X direction and the −X direction (hereinafter referred to also as "X direction").

The liquid container 20 contains the ink to be ejected from the liquid ejecting head 1. For example, as the ink, ink having pigments dispersed as a colorant in a dissolvent, ink containing dye, or ink containing both pigments and dye as colorants can be used. The ink may include various kinds of liquid composition such as popular water-based ink, oil-based ink, gel ink, hot melt ink, etc. The liquid container 20 is, for example, a cartridge that can be detachably attached to the liquid ejecting apparatus 100, a bag-type ink pack made of a flexible film material, an ink tank that can be refilled with ink, or the like.

The circulation mechanism 30 is a device configured to, under the control of the control unit 90, supply the liquid contained in the liquid container 20 to the liquid ejecting head 1. For example, the circulation mechanism 30 is a pump. Moreover, the circulation mechanism 30 collects ink that remains inside the liquid ejecting head 1 and causes the collected ink to flow back to the liquid ejecting head 1.

The transportation mechanism 40 transports the printing paper PP in a sub-scanning direction. The sub-scanning direction is orthogonal to the main scanning direction (X direction), and, in the present embodiment, includes the +Y direction and the −Y direction (hereinafter referred to also as "Y direction"). The transportation mechanism 40 includes a transportation rod 44 to which three transportation rollers 42 are attached, and a transporting motor 46 configured to drive the transportation rod 44 for rotation. When the transportation rod 44 is driven to rotate by the transporting motor 46, the plurality of transportation rollers 42 rotates to transport the printing paper PP in the sub-scanning direction (the +Y direction). The number of the transportation rollers 42 is not limited to three; it may be any number. A plurality of transportation mechanisms 40 may be provided.

The movement mechanism 55 includes a transportation belt 54, a moving motor 56, and a pulley 57, in addition to the carriage 53 described above. On the carriage 53, the liquid ejecting heads 1 are mounted in a state of being able to eject ink. The carriage 53 is attached to the transportation belt 54. The transportation belt 54 is stretched between the moving motor 56 and the pulley 57. Driven by the moving motor 56, the transportation belt 54 reciprocates in the main scanning direction. The carriage 53 attached to the transportation belt 54 also reciprocates in the main scanning direction due to this belt motion. The control unit 90 controls operation for ejecting ink. For example, the control unit 90 controls the reciprocating motion of the carriage 53 in the main scanning direction and the transportation of the printing paper PP in the sub-scanning direction. Moreover, for example, the control unit 90 controls the ejection of the ink onto the printing paper PP by driving piezoelectric elements (piezoelectric elements PZ1 and PZ2 to be described later) by outputting a drive signal to the liquid ejecting head unit 10. The control unit 90 may include, for example, a processing circuit such as a CPU (central processing unit) or an FPGA (field programmable gate array), and a storage circuit such as a semiconductor memory.

A2. Detailed Configuration of Liquid Ejecting Head 1

Figure 2:
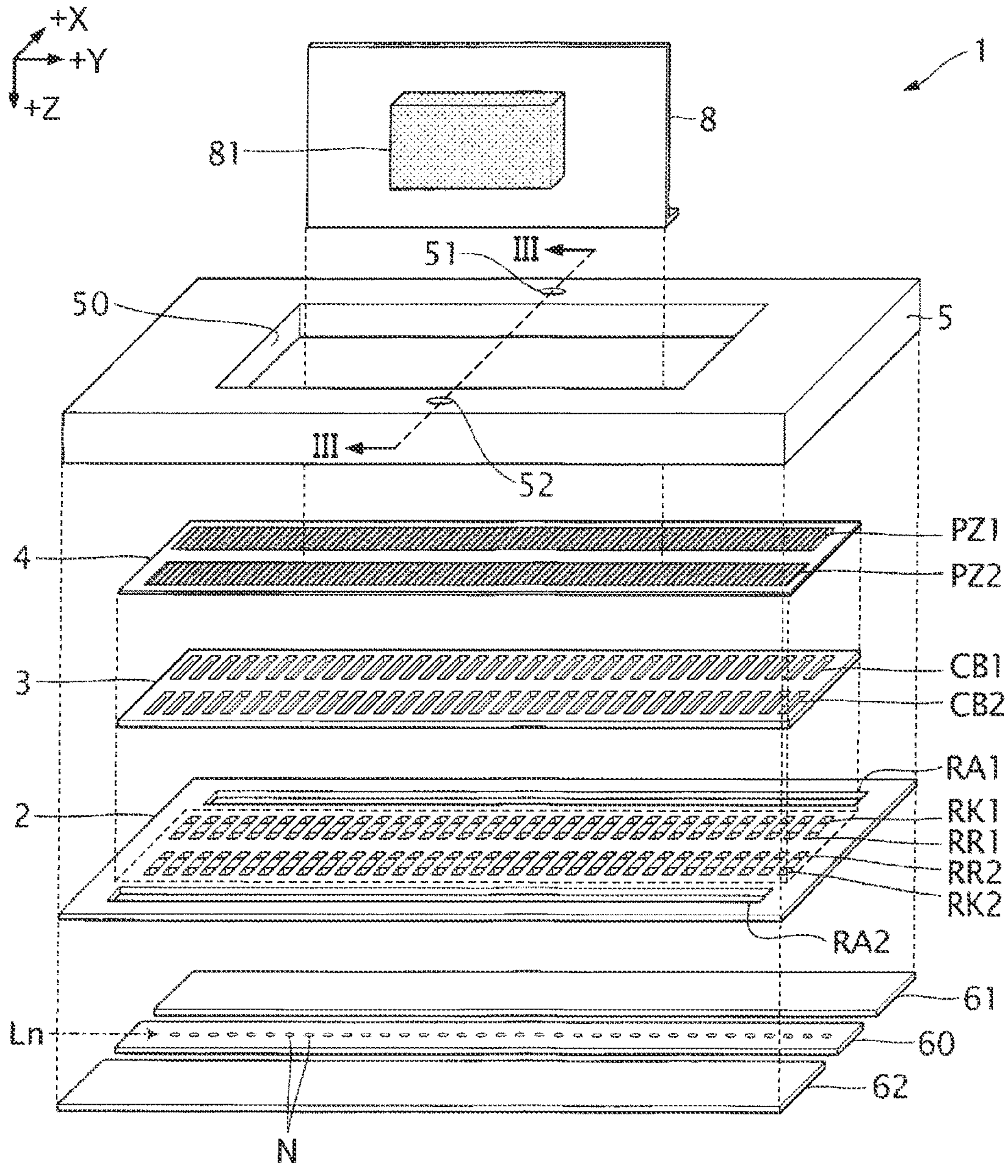
FIG. 2 is an exploded perspective view of a detailed configuration of a liquid ejecting head illustrated in FIG. 1.
Figure 3:
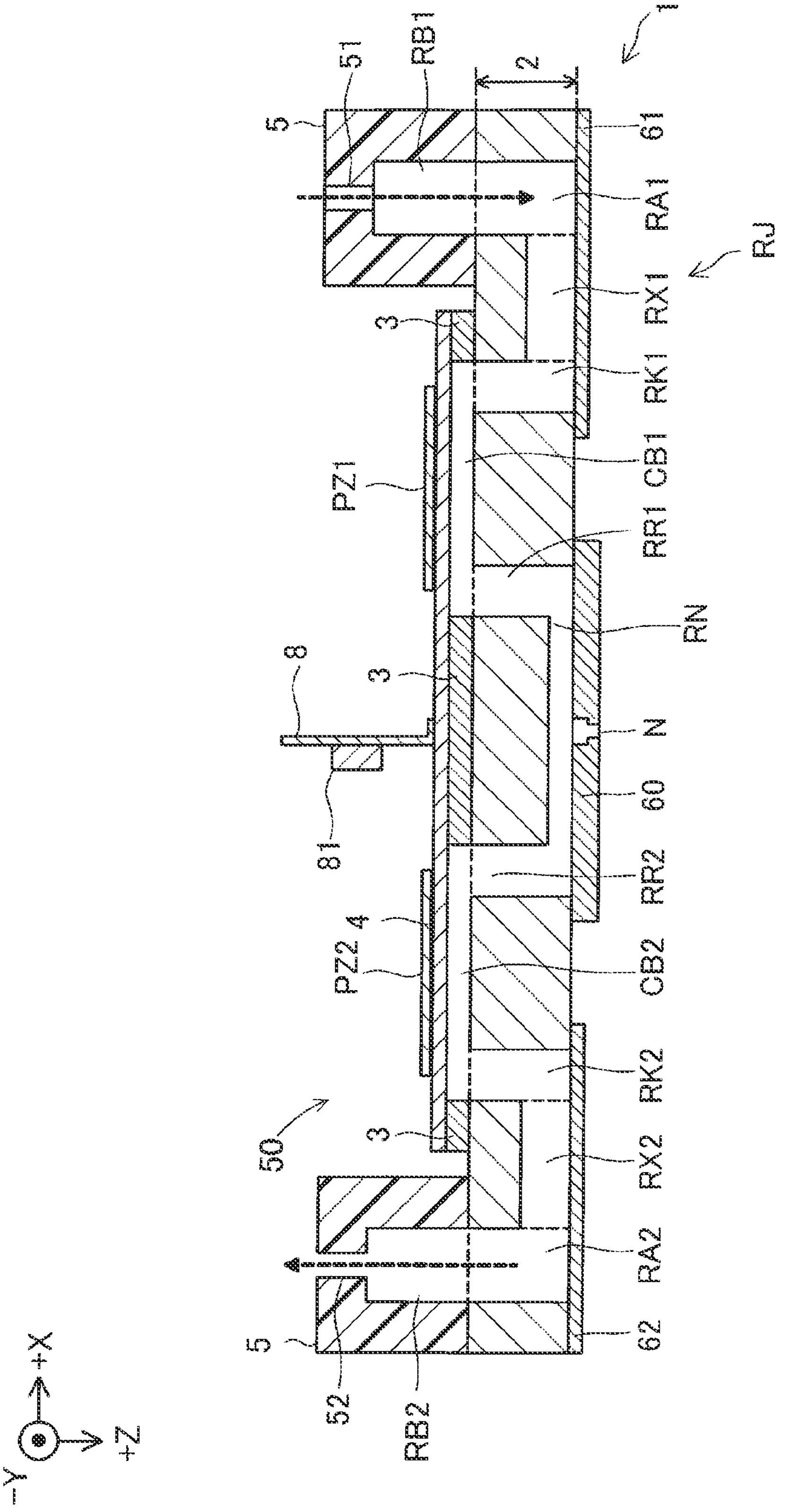
FIG. 3 is a cross-sectional view of a detailed configuration of the liquid ejecting head.
Figure 4:
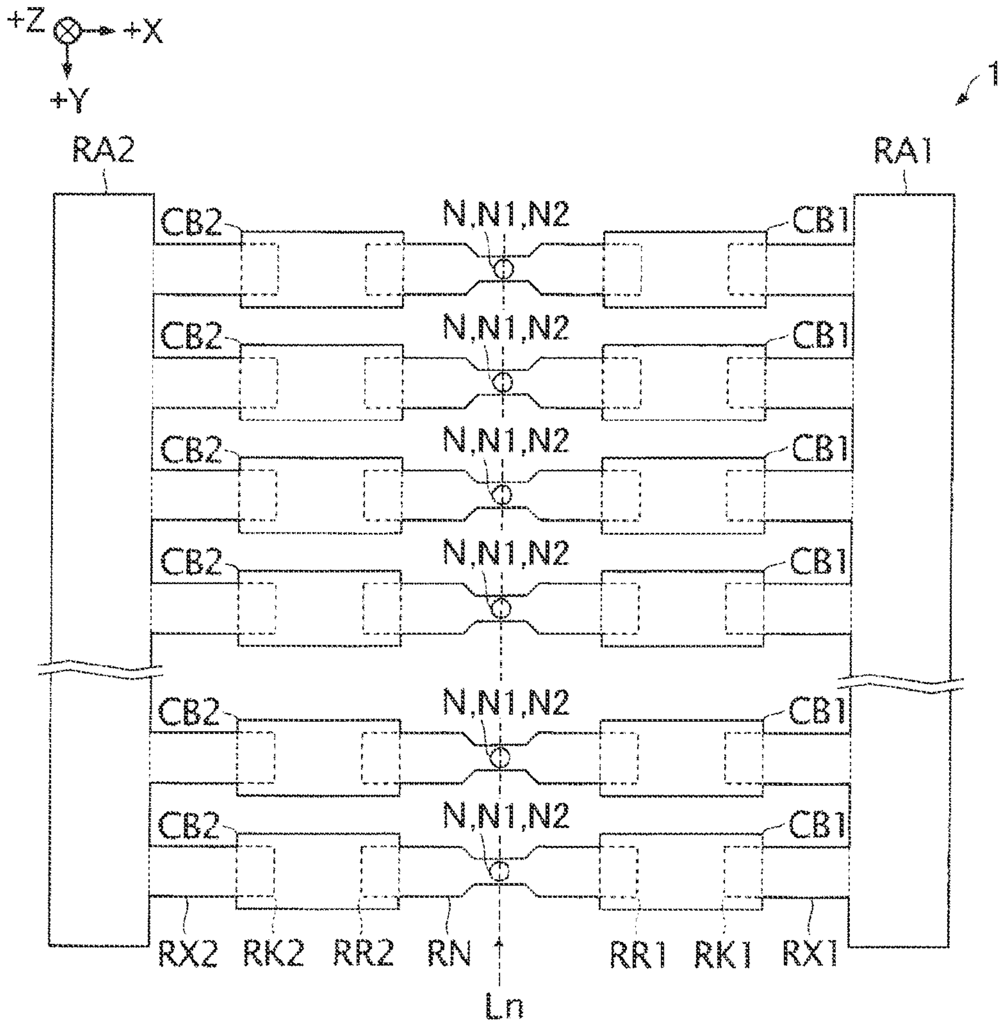
FIG. 4 is a plan view of the liquid ejecting head viewed in the −Z direction.

FIG. 2 is an exploded perspective view of a detailed configuration of the liquid ejecting head 1 illustrated in FIG. 1. FIG. 3 is a cross-sectional view of a detailed configuration of the liquid ejecting head 1. In FIG. 3, a cross section taken along the line III-III of FIG. 2 is illustrated. FIG. 4 is a plan view of the liquid ejecting head 1 viewed in the −Z direction.

As illustrated in FIG. 2, the liquid ejecting head 1 includes a nozzle substrate 60, a communication plate 2, a pressure compartment substrate 3, a diaphragm 4, a reservoir forming substrate 5, a wiring substrate 8, and compliance sheets 61 and 62.

As illustrated in FIG. 2, the nozzle substrate 60 is a plate-like member that has longer sides in the Y direction. The nozzle substrate 60 is located at the most −Z-directional position in the liquid ejecting head 1. The nozzle substrate 60 is manufactured by processing, for example, a monocrystalline silicon substrate. A plurality of nozzles N the number of which is M is formed in the nozzle substrate 60. The number M is any integer that is not less than one. The nozzle N is formed as a through hole going through the nozzle substrate 60 in its thickness direction (Z direction). The nozzle N corresponds to an orifice through which ink is ejected from the liquid ejecting head 1. In the present embodiment, the nozzles N, the number of which is M, are arranged linearly in such a way as to form a nozzle row Ln extending in the Y direction. As illustrated in FIG. 3, the nozzle N according to the present embodiment is a two-tiered nozzle. The term "two-tiered nozzle" means a nozzle that has a structure in which two portions having different capacities are connected in the Z direction. A detailed description of the nozzle N will be given later.

As illustrated in FIG. 2, flow passages through which ink flows are formed in the communication plate 2. Specifically, a single common supply flow passage RA1 extending in the Y direction and a single common discharge flow passage RA2 extending in the Y direction are formed in the communication plate 2. As illustrated in FIG. 3, in addition, M-number of nozzle flow passages RN, M-number of supply flow passages RR1, M-number of discharge flow passages RR2, M-number of communication flow passages RK1, M-number of communication flow passages RK2, M-number of communication flow passages RX1, and M-number of communication flow passages RX2, which correspond to the M-number of nozzles N respectively, are formed in the communication plate 2.

As illustrated in FIG. 3, the communication flow passage RX1 is continuous from the common supply flow passage RA1. The communication flow passage RX1 extends in the −X direction from the common supply flow passage RA1 along the X-directional axis. The communication flow passage RX1 is continuous to the communication flow passage RK1. The communication flow passage RK1 extends in the −Z direction from the communication flow passage RX1 along the Z-directional axis. The communication flow passage RK1 is continuous to one end of a pressure compartment CB1 to be described later. The other end of the pressure compartment CB1 is continuous to the supply flow passage RR1. The supply flow passage RR1 extends in the +Z direction from the pressure compartment CB1 along the Z-directional axis. The supply flow passage RR1 is continuous to one end of the nozzle flow passage RN. The nozzle flow passage RN extends in the X direction, and one nozzle N is provided in the neighborhood of the center thereof. A part of ink flowing through the nozzle flow passage RN in the X direction is ejected from the nozzle N.

The other end of the nozzle flow passage RN is continuous to the discharge flow passage RR2. The discharge flow passage RR2 extends in the −Z direction from the nozzle flow passage RN along the Z-directional axis. The discharge flow passage RR2 is continuous to one end of a pressure compartment CB2 to be described later. The other end of the pressure compartment CB2 is continuous to the communication flow passage RK2. The communication flow passage RK2 extends in the +Z direction from the pressure compartment CB2 along the Z-directional axis. The communication flow passage RK2 is continuous to one end of the communication flow passage RX2. The communication flow passage RX2 extends in the −X direction from the communication flow passage RK2 along the X-directional axis. The other end of the communication flow passage RX2 is continuous to the common discharge flow passage RA2.

As illustrated in FIGS. 2 and 3, the compliance sheet 61 is disposed on the +Z-side surface of the communication plate 2 in such a way as to hermetically close the common supply flow passage RA1, the communication flow passage RX1, and the communication flow passage RK1. The compliance sheet 61 absorbs the pressure fluctuations of ink inside the common supply flow passage RA1, the communication flow passage RX1, and the communication flow passage RK1. The compliance sheet 62 is disposed on the +Z-side surface of the communication plate 2 in such a way as to hermetically close the common discharge flow passage RA2, the communication flow passage RX2, and the communication flow passage RK2. The compliance sheet 62 absorbs the pressure fluctuations of ink inside the common discharge flow passage RA2, the communication flow passage RX2, and the communication flow passage RK2. The compliance sheet 61, 62 is a flexible sheet-like member that is elastically deformable.

As illustrated in FIGS. 2 and 3, the reservoir forming substrate 5 is disposed on the −Z-side surface of the communication plate 2. The reservoir forming substrate 5 is a member that has longer sides in the Y direction. The reservoir forming substrate 5 is formed by, for example, injection molding of a resin material. Flow passages through which ink flows are formed inside the reservoir forming substrate 5. Specifically, a single common supply flow passage RB1 and a single common discharge flow passage RB2 are formed in the reservoir forming substrate 5. The common supply flow passage RB1 is in communication with the common supply flow passage RA1. The common discharge flow passage RB2 is in communication with the common discharge flow passage RA2.

An inlet 51 that is in communication with the common supply flow passage RB1 and an outlet 52 that is in communication with the common discharge flow passage RB2 are provided in the reservoir forming substrate 5. Ink is supplied from the liquid container 20 to the common supply flow passage RB1 through the inlet 51. Ink having been pooled in the common discharge flow passage RB2 is collected through the outlet 52.

In the present embodiment, ink supplied from the liquid container 20 to the inlet 51 by the circulation mechanism 30 flows through the common supply flow passage RB1 into the common supply flow passage RA1. A part of the ink that has flowed into the common supply flow passage RA1 is split to flow through the communication flow passages RX1 and next through the communication flow passages RK1 and then flows into each of the pressure compartments CB1. A part of the ink that has flowed into the pressure compartment CB1 flows through the supply flow passage RR1, the nozzle flow passage RN, and the discharge flow passage RR2 in this order and then flows into the pressure compartment CB2. A part of the ink that has flowed into the pressure compartment CB2 flows through the communication flow passage RK2 and the communication flow passage RX2 in this order, thereafter merges with the ink of the other branches at the common discharge flow passage RA2, and then flows through the common discharge flow passage RB2 to be discharged through the outlet 52. In the description given below, the flow path of ink from the common supply flow passage RA1 to the common discharge flow passage RA2 will be referred to also as "circulation flow passage RJ". Specifically, the circulation flow passage RJ includes the common supply flow passage RA1, the communication flow passage RX1, the communication flow passage RK1, the pressure compartment CB1, the supply flow passage RR1, the nozzle flow passage RN, the discharge flow passage RR2, the pressure compartment CB2, the communication flow passage RK2, the communication flow passage RX2, and the common discharge flow passage RA2. The M-number of circulation flow passages RJ are arranged in the Y direction. As illustrated in FIG. 4, the common supply flow passage RA1 is connected to the common discharge flow passage RA2 via the M-number of circulation flow passages RJ corresponding respectively to the M-number of nozzles N. That is, ink is supplied via the common supply flow passage RA1 to each of the M-number of nozzle flow passages RN, and ink is discharged from each of the M-number of nozzle flow passages RN via the common discharge flow passage RA2. It can also be said that the common supply flow passage RA1 is connected indirectly to one end of the nozzle flow passages RN, and the common discharge flow passage RA2 is connected indirectly to the other end of the nozzle flow passages RN. The common supply flow passage RA1 and the common discharge flow passage RA2 may be connected directly to the nozzle flow passages RN.

As illustrated in FIGS. 2 and 3, the reservoir forming substrate 5 has an opening 50. The pressure compartment substrate 3, the diaphragm 4, and the wiring substrate 8 are provided inside the opening 50. The pressure compartment substrate 3 is a plate-like member that has longer sides in the Y direction. The pressure compartment substrate 3 is provided on the −Z-side surface of the communication plate 2. The pressure compartment substrate 3 is disposed substantially in parallel with an X-Y plane. The pressure compartment substrate 3 is manufactured by, for example, processing a monocrystalline silicon substrate by using an etching technology. Flow passages through which ink flows are formed in the pressure compartment substrate 3. Specifically, the M-number of pressure compartments CB1 corresponding respectively to the M-number of nozzles N, and the M-number of pressure compartments CB2 corresponding respectively to the M-number of nozzles N, are formed in the pressure compartment substrate 3.

The pressure compartment CB1 extends in the X direction in such a way as to provide communication between the communication flow passage RK1 and the supply flow passage RR1. The pressure compartment CB2 extends in the X direction in such a way as to provide communication between the communication flow passage RK2 and the discharge flow passage RR2.

The diaphragm 4 is a plate-like member that has longer sides in the Y direction. As illustrated in FIGS. 2 and 3, the diaphragm 4 is provided on the −Z-side surface of the pressure compartment substrate 3. The diaphragm 4 is a member that is capable of vibrating elastically, and applies pressure to the ink that is present inside the pressure compartment CB1, CB2. The diaphragm 4 is disposed substantially in parallel with an X-Y plane. On the −Z-side surface of the diaphragm 4, M-number of piezoelectric elements PZ1 corresponding respectively to the M-number of pressure compartments CB1, and M-number of piezoelectric elements PZ2 corresponding respectively to the M-number of pressure compartments CB2, are provided. The piezoelectric element PZ1, PZ2 is an energy conversion element that converts the electric energy of a drive signal transmitted from the control unit 90 into motion energy. In the present embodiment, the piezoelectric element PZ1, PZ2 is a passive element that deforms in accordance with a change in potential of the drive signal.

The wiring substrate 8 is mounted on the −Z-side surface of the diaphragm 4. The wiring substrate 8 is a component that provides electric connection between the control unit 90 and the liquid ejecting head 1. A flexible wiring board such as, for example, FPC or FFC is used as the wiring substrate 8. A drive circuit 81 is mounted on the wiring substrate 8. Based on a control signal, the drive circuit 81 switches whether or not to supply a drive signal to the piezoelectric element PZ1, PZ2.

The piezoelectric element PZ1, PZ2 deforms in accordance with a change in potential of the drive signal. The diaphragm 4 vibrates by being driven by the deformation of the piezoelectric element PZ1, PZ2. The vibration of the diaphragm 4 causes a change in the internal pressure of the pressure compartment CB1, CB2. Due to the change in the internal pressure of the pressure compartment CB1, CB2, ink with which the inside of the pressure compartment CB1, CB2 is filled is ejected from the nozzle N after flowing through the supply flow passage RR1/the discharge flow passage RR2 and the nozzle flow passage RN. Specifically, when the piezoelectric element PZ1 is driven by means of a drive signal, a part of the ink with which the inside of the pressure compartment CB1 is filled flows through the supply flow passage RR1 and then through the nozzle flow passage RN to be ejected from the nozzle N. When the piezoelectric element PZ2 is driven by means of a drive signal, a part of the ink with which the inside of the pressure compartment CB2 is filled flows through the discharge flow passage RR2 and then through the nozzle flow passage RN to be ejected from the nozzle N.

The liquid ejecting apparatus 100 according to the present embodiment circulates the ink from the common supply flow passage RA1 to the common discharge flow passage RA2 through the circulation flow passages RJ. For this reason, even if there is a period during which no ink that is present inside the pressure compartment CB1, CB2 is ejected from the nozzle N, it is possible to reduce or prevent the stagnation of the ink inside the pressure compartment CB1, CB2, the nozzle flow passage RN, and the like. Therefore, the liquid ejecting apparatus 100 according to the present embodiment makes it possible to reduce or prevent an increase in the viscosity of the ink inside the pressure compartment CB1, CB2, the nozzle flow passage RN, and the like and thus suppress the occurrence of ejection abnormality that disables the ejection of the ink from the nozzle N.

The liquid ejecting apparatus 100 according to the present embodiment ejects, from the nozzle N, the ink with which the inside of the pressure compartment CB1 is filled and the ink with which the inside of the pressure compartment CB2 is filled. Therefore, for example, as compared with a structure in which the ink of one pressure compartment CB1, CB2 only is ejected from the nozzle N, the liquid ejecting apparatus 100 according to the present embodiment makes it possible to make an amount of the ink ejected from the nozzle N larger.

A3. Detailed Structure of Nozzle N

Figure 5:
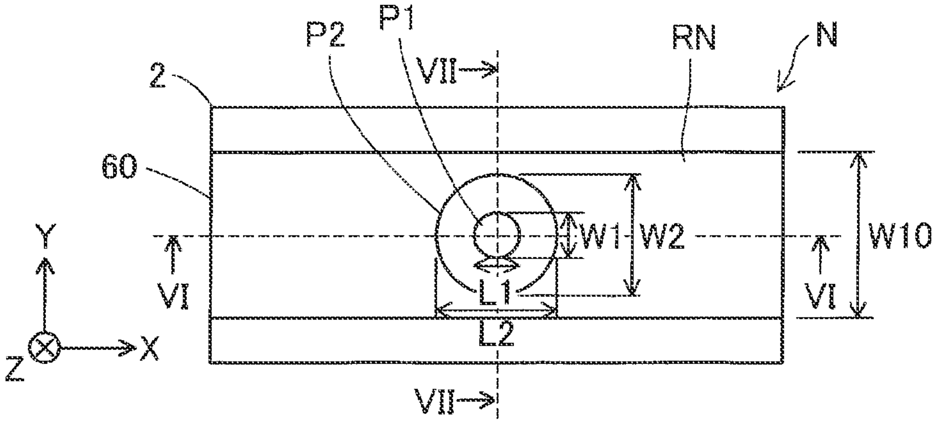
FIG. 5 is a diagram for explaining a nozzle according to the present embodiment.
Figure 6:
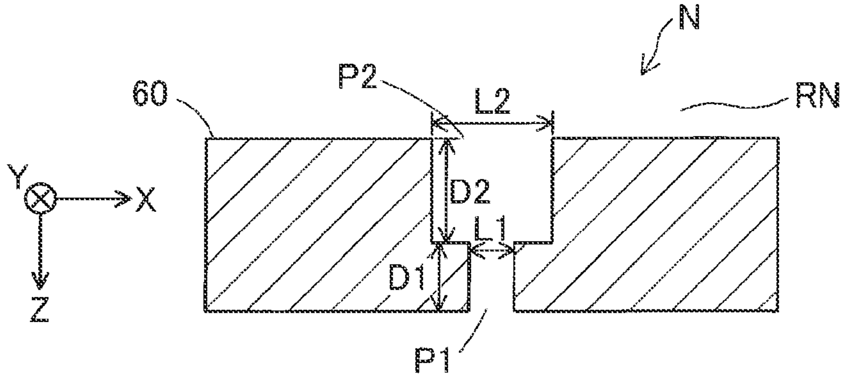
FIG. 6 is a diagram for explaining the nozzle according to the present embodiment.
Figure 7:
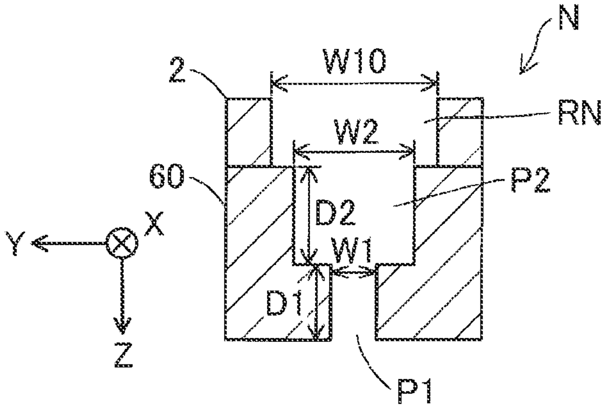
FIG. 7 is a diagram for explaining the nozzle according to the present embodiment.

FIGS. 5 to 7 are diagrams for explaining the nozzle N according to the present embodiment. FIG. 5 is a Z-directional view of the nozzle N. FIG. 6 illustrates a cross section taken along the line VI-VI of FIG. 5. FIG. 7 illustrates a cross section taken along the line VII-VII of FIG. 5. Note that, in FIGS. 5 to 7, the structure of the nozzle substrate 60 and the nozzle N only in the nozzle flow passage RN is illustrated, and the illustration of the structure of others is omitted.

As illustrated in FIGS. 5 to 7, the nozzle N includes a first portion P1 and a second portion P2. The second portion P2 is located closer to the nozzle flow passage RN in the Z direction than the first portion P1 is. That is, the nozzle N is configured as a two-tiered nozzle. The first portion P1 and the second portion P2 are formed by processing the nozzle substrate 60 by using an etching technology or the like. The first portion P1 is connected from the +Z-directional side to approximately the center in the X direction and the Y direction of the second portion P2. The first portion P1 ejects ink supplied from the second portion P2 toward the outside. As illustrated in FIG. 5, the length L1 of the first portion P1 in the X direction is substantially equal to the width W1 of the first portion P1 in the Y direction, and the first portion P1 has a shape that looks like a circle when viewed in the Z direction.

As illustrated in FIGS. 5 to 7, the length L2, the width W2, and the depth D2 of the second portion P2 are greater than the length L1, the width W1, and the depth D1 of the first portion P1 respectively. The width W2 of the second portion P2 is less than the width W10 of the nozzle flow passage RN. The capacity of the second portion P2 is larger than the capacity of the first portion P1. As illustrated in FIG. 5, the length L2 of the second portion P2 in the X direction is substantially equal to the width W2 of the second portion P2 in the Y direction, and the second portion P2 has a shape that looks like a circle. Therefore, it can also be said that the first portion P1 and the second portion P2 are concentric circles. A part of ink that flows through the nozzle flow passage RN in the X direction flows into the second portion P2. At least a part of the ink having flowed into the second portion P2 is supplied to the first portion P1.

In the present embodiment, a ratio between inertance M1 of the first portion P1 and inertance M2 of the second portion P2 (hereinafter will be referred to as "inertance ratio") satisfies a relation of $M2/M1<0.26$. Let S be the cross-sectional area of the flow passage. Let 1 be the length of the flow passage. Let p be the density of the liquid. Given these definitions, inertance M of a flow passage through which liquid flows can be calculated using the following formula (1):

$$M=\rho l/S \tag{1}$$

Since the first portion P1 and the second portion P2 can be regarded each as a flow passage through which ink flows in the Z direction, the inertance M1 of the first portion P1 can be expressed as $M1=\rho d1/S1$, where S1 denotes the cross-sectional area of the first portion P1 in a section on an X-Y plane, d1 denotes the length of the flow passage, that is, the length in the Z direction, and p denotes the density of the ink. Similarly, the inertance M2 of the second portion P2 can be expressed as $M2=\rho d2/S2$, where S2 denotes the cross-sectional area of the second portion P2 in a section on an X-Y plane, d2 denotes the length of the flow passage, that is, the length in the Z direction, and ρ denotes the density of the ink. In the present embodiment, it is preferable if the inertance M1 is greater than 0.10, and it is preferable if the inertance M2 is greater than 0.001.

The inventors of the present application discovered that, by setting the inertance ratio in such a way as to satisfy the above-described relation of $M2/M1<0.26$, it is possible to suppress an increase in viscosity of ink inside the nozzle N. In related art, it was believed to be preferable to set a relatively high inertance ratio (for example, $M2/M1>0.30$) in a two-tiered nozzle. This is because a stable ejected droplet is achieved by making a difference between the inertance M2 and the inertance M1 small and reducing an inertance change between the second portion P2 and the first portion P1. When a two-tiered nozzle structure is applied to a nozzle that ejects a micro droplet, since its droplet ejection amount is smaller than that of an ordinary nozzle, liquid replacement occurs less frequently between the nozzle and the nozzle flow passage. Moreover, because of a smaller ejected droplet, an amount of meniscus oscillations is smaller, and it is thus difficult to agitate the ink (ink circulation) inside the nozzle by means of the meniscus oscillations. For this reason, the liquid whose viscosity has increased due to exposure to the air at a boundary interface between the nozzle and the air might stagnate inside the nozzle and, therefore, the liquid might not be ejected properly.

Figure 8:
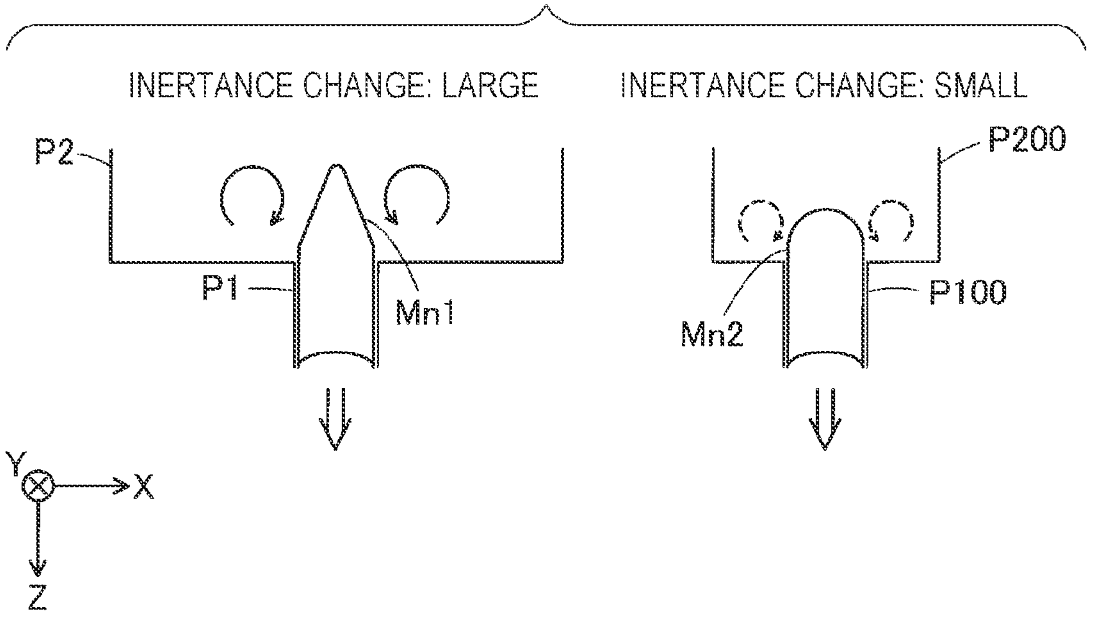
FIG. 8 is an explanation diagram schematically illustrating an example of a state of a meniscus.

In view of these considerations, the inventors of the present application discovered that, by setting a smaller value for the inertance ratio in such a way as to satisfy the above-described relation of M2/M1<0.26, it is possible to circulate the ink inside the nozzle more and thus suppress an increase in the viscosity of the ink. FIG. 8 is an explanation diagram schematically illustrating an example of a state of a meniscus. The left part of FIG. 8 illustrates a meniscus Mn1 in a case where the inertance ratio is relatively low (for example, M2/M1<0.26), that is, a case where an inertance change between the second portion P2 and the first portion P1 is large. The right part of FIG. 8 illustrates a meniscus Mn2 in a case where the inertance ratio is relatively high (for example, M2/M1>0.30), that is, a case where an inertance change between a fourth portion P200 and a third portion P100 is small. The fourth portion P200 and the third portion P100 constitute a nozzle, and the capacity of the fourth portion P200 is larger than the capacity of the third portion P100. The thick arrow in FIG. 8 indicates the direction in which ink is ejected. As illustrated at the left part of FIG. 8, when the inertance change is large, the interface of the meniscus Mn1 inside the second portion P2 extends in a tapering manner in the −Z direction. This seems to be because the change in inertance is large when moving from the second portion P2, at which the inertance is relatively large (that is, it is easier for the ink to move), to the first portion P1, at which the inertance is relatively small (that is, it is harder for the ink to move). Since the meniscus Mn1 described above is formed, relatively great meniscus oscillations occur. For this reason, vortices indicated by arrows near the meniscus Mn1 are generated when the ink is ejected. The vortices agitate the ink inside the nozzle N greatly. On the other hand, as illustrated at the right part of FIG. 8, when the inertance change is small, the interface of the meniscus Mn2 inside the second portion P300 is relatively flat when compared with the meniscus Mn1. For this reason, vortices generated near the meniscus Mn2 when the ink is ejected are smaller than those generated near the meniscus Mn1. Since the vortices that are generated are smaller, the ink is harder to be agitated. Therefore, it is considered that, by setting the inertance ratio in such a way as to satisfy the relation of M2/M1<0.26, it is possible to suppress an increase in viscosity of ink inside the nozzle N and thus eject the ink properly.

In the liquid ejecting head 1 described above, the capacity of the first portion P1 is smaller than the capacity of the second portion P2, and the relation of M2/M1<0.26 is satisfied where M1 denotes the inertance of the first portion P1, and M2 denotes the inertance of the second portion P2; therefore, relatively great oscillations of the meniscus Mn1 occur when the liquid is ejected, and it is possible to greatly agitate the liquid inside the second portion. By this means, it is possible to suppress an increase in the viscosity of the liquid inside the nozzle.

B. Examples

An ejection test was conducted using a nozzle having various sizes. The ejection test was conducted by ejecting ink by using an ink-jet printer. The results are shown in Tables 1 and 2 below. In Examples, the test was conducted using the nozzle N the inertance ratio M2/M1 of which was set to be less than 0.26. In Comparative Examples, the test was conducted using the nozzle N the inertance ratio M2/M1 of which was set to be not less than 0.26. The density p of the liquid when calculating the inertance M1, M2 is 1. In Tables 1 and 2, all of the lengths L1 and L2, the widths W1 and W2, and the depths D1 and D2 are shown in micrometers. Both in Examples and Comparative Examples, the capacity of the first portion P1 is smaller than the capacity of the second portion P2. Since each of the first portion P1 and the second portion P2 is formed by etching a single nozzle substrate 60, the sum of the depth D1 and the depth D2 is equal to the thickness of the nozzle substrate 60.

TABLE 1

| | First Nozzle (N1) | | | | | | | | | |
|---|---|---|---|---|---|---|---|---|---|---|
| | First Portion (P1) | | | Second Portion (P2) | | | Inertance | | | |
| | Length L1 | Width W1 | Depth D1 | Length L2 | Width W2 | Depth D2 | M1 | M2 | M2/M1 | Evaluation |
| Example 1 | 10 | 10 | 16 | 37 | 37 | 49 | 0.2 | 0.04 | 0.22 | A |
| Example 2 | 9 | 9 | 16 | 37 | 37 | 49 | 0.22 | 0.04 | 0.18 | A |
| Example 3 | 8 | 8 | 16 | 37 | 37 | 49 | 0.29 | 0.04 | 0.14 | A |
| Example 4 | 10 | 10 | 20 | 37 | 37 | 49 | 0.25 | 0.04 | 0.16 | A |
| Example 5 | 10 | 10 | 25 | 37 | 37 | 49 | 0.34 | 0.04 | 0.11 | A |
| Example 6 | 10 | 10 | 16 | 44 | 44 | 49 | 0.2 | 0.03 | 0.16 | A |
| Example 7 | 10 | 10 | 16 | 52 | 52 | 49 | 0.2 | 0.02 | 0.11 | A |
| Example 8 | 10 | 10 | 16 | 841 | 45 | 49 | 0.2 | 0.002 | 0.008 | A |
| Example 9 | 10 | 10 | 16 | 841 | 45 | 40 | 0.32 | 0.002 | 0.005 | A |
| Example 10 | 10 | 10 | 16 | 50 | 45 | 49 | 0.2 | 0.007 | 0.034 | A |
| Example 11 | 10 | 10 | 16 | 70 | 45 | 49 | 0.2 | 0.005 | 0.025 | A |
| Example 12 | 10 | 10 | 16 | 90 | 45 | 49 | 0.2 | 0.004 | 0.019 | A |
| Example 13 | 10 | 10 | 16 | 120 | 45 | 49 | 0.2 | 0.003 | 0.014 | A |
| Example 14 | 10 | 10 | 25 | 50 | 45 | 40 | 0.2 | 0.006 | 0.018 | A |
| Example 15 | 10 | 10 | 25 | 70 | 45 | 40 | 0.2 | 0.004 | 0.013 | A |

TABLE 1-continued

| | First Nozzle (N1) | | | | | | | | | |
|---|---|---|---|---|---|---|---|---|---|---|
| | First Portion (P1) | | | Second Portion (P2) | | | Inertance | | | |
| | Length L1 | Width W1 | Depth D1 | Length L2 | Width W2 | Depth D2 | M1 | M2 | M2/M1 | Evaluation |
| Example 16 | 10 | 10 | 25 | 90 | 45 | 40 | 0.2 | 0.003 | 0.01 | A |
| Example 17 | 10 | 10 | 25 | 120 | 45 | 40 | 0.2 | 0.002 | 0.007 | A |

TABLE 2

| | First Nozzle (N1) | | | | | | | | | |
|---|---|---|---|---|---|---|---|---|---|---|
| | First Portion (P1) | | | Second Portion (P2) | | | Inertance | | | |
| | Length L1 | Width W1 | Depth D1 | Length L2 | Width W2 | Depth D2 | M1 | M2 | M2/M1 | Evaluation |
| Comparative Example 1 | 11 | 11 | 16 | 37 | 37 | 49 | 0.17 | 0.04 | 0.26 | B |
| Comparative Example 2 | 20 | 20 | 30 | 37 | 37 | 35 | 0.1 | 0.03 | 0.33 | C |
| Comparative Example 3 | 22 | 22 | 30 | 37 | 37 | 35 | 0.08 | 0.03 | 0.4 | C |
| Comparative Example 4 | 23 | 23 | 25 | 37 | 37 | 40 | 0.06 | 0.04 | 0.61 | C |
| Comparative Example 5 | 21 | 21 | 35 | 37 | 37 | 40 | 0.1 | 0.04 | 0.61 | C |
| Comparative Example 6 | 26 | 26 | 35 | 37 | 37 | 30 | 0.07 | 0.03 | 0.4 | C |
| Comparative Example 7 | 29 | 29 | 25 | 37 | 37 | 40 | 0.04 | 0.04 | 0.93 | C |
| Comparative Example 8 | 26 | 26 | 20 | 37 | 37 | 45 | 0.04 | 0.04 | 1.09 | C |

"Evaluation" shown at the right end of Tables 1 and 2 indicates the evaluation of ejection performance in the ejection test. Specifically, "A" means that an increase in viscosity of ink was suppressed due to sufficient agitation of the ink inside the nozzle N and that the ink was ejected properly. "B" means that, though the ink was ejected properly, there is a possibility that the agitation of the ink inside the nozzle N might be insufficient, and the viscosity of the ink might increase during use over a relatively long time. "C" means that the ink was not ejected properly with an increase in viscosity because of insufficient agitation of the ink inside the nozzle N.

In Examples 1 to 5, the test was conducted while changing the size of the first portion P1 only, without changing the size of the second portion P2. In Examples 6 to 13, the test was conducted while changing the size of the second portion P2 only, with the size of the first portion P1 set to be the same as the size in Example 1. Examples 14 to 17 correspond to Examples 10 to 13 respectively. Specifically, in each of Examples 14 to 17, the test was conducted while changing the depth D1 of the first portion P1 and the depth D2 of the second portion P2 only from their values of the corresponding one of Examples 10 to 13. As shown in Table 1, the evaluation result was "A" for all of Examples 1 to 17. This is presumably because, since the inertance ratio M2/M1 was set to be less than 0.26, the ink was agitated sufficiently inside the nozzle N, and an increase in viscosity of the ink was therefore suppressed. Note that, among them, the inertance ratio in Example 17 is 0.007, which is relatively low, and an amount of change between the inertance M1 and the inertance M2 is relatively large. For this reason, the agitation of ink can be performed sufficiently, and an increase in viscosity inside the nozzle N can be suppressed well; however, there is a possibility that the ejection of the ink might be unstable with an excessive extending of a meniscus in the direction of ejection. The inertance ratio in Example 9 is 0.005, which is relatively low. For the same reason as that of Example 17, the ejection of the ink might be unstable in Example 9, too.

As shown in Table 2, the evaluation result was "B" for Comparative Example 1. This is because, though the ink was ejected properly by setting the inertance ratio to be 0.26, there is a possibility that the agitation of the ink inside the nozzle N might be insufficient, and the viscosity of the ink might increase during use over a relatively long time. The evaluation result was "C" for all of Comparative Examples 2 to 8. This is because the agitation inside the nozzle N was insufficient due to their relatively high inertance ratio.

As is clear from the results of the ejection test described above, by setting the ratio between the inertance M1 of the first portion P1 and the inertance M2 of the second portion P2 of the nozzle N in such a way as to satisfy the relation of $M2/M1<0.26$, it is possible to greatly agitate the ink inside the nozzle N and thus suppress an increase in the viscosity of the ink.

C. Other Embodiments (C1) As disclosed in the above embodiment and Examples 1 to 17 described above, the length L2 of the second portion P2 in the X direction may be greater than the length L1 of the first portion P1 in the X direction. With this structure, as compared with a structure in which the length L2 is less than the length L1, it is possible to make the region of contact of the second portion P2 and the nozzle flow passage RN in the liquid flow direction (X direction) larger, and it is therefore possible to improve the efficiency of ink supply and ink discharge between the second portion P2 and the nozzle flow passage RN. By this means, it is possible to suppress an increase in the viscosity of the ink inside the nozzle N.

(C2) As disclosed in the above embodiment and Examples 1 to 17 described above, the depth D1 of the first portion P1 in the Z direction may be less than the depth D2 of the second portion P2 in the Z direction. With this structure, as compared with a structure in which the depth D1 is greater than the depth D2, it is possible to suppress pressure loss of liquid inside the first portion P1 and thus improve the performance of ejecting the liquid. Moreover, since it is possible to make the inertance M1 of the first portion P1 smaller, the liquid inside the first portion P1 is easier to move, which makes the ejection of the liquid easier.

(C3) In the above embodiment, the inertance M1 is greater than 0.10, and the inertance M2 is greater than 0.001. However, the scope of the present disclosure is not limited to this example. As long as the condition that the capacity of the first portion P1 is smaller than the capacity of the second portion P2 is met, the inertance M1 may be 0.10 or less, and the inertance M2 may be 0.001 or less.

(C4) In the above embodiment, the width W1 of the first portion P1 in the Y direction and the width W2 of the second portion P2 in the Y direction may be equal to each other.

(C5) In the above embodiment, liquid is supplied to each of the plurality of nozzle flow passages RN via the common supply flow passage RA1, and the liquid is discharged from each of the plurality of nozzle flow passages RN via the common discharge flow passage RA2. However, the scope of the present disclosure is not limited to this example. A plurality of supply flow passages via which liquid is supplied to the plurality of nozzle flow passages RN respectively, and a plurality of discharge flow passages via which the liquid is discharged from the plurality of nozzle flow passages RN respectively, may be provided. In other words, individual supply flow passages connected directly or indirectly to, and individual discharge flow passages connected directly or indirectly from, the plurality of nozzle flow passages RN respectively may be provided.

Figure 9:
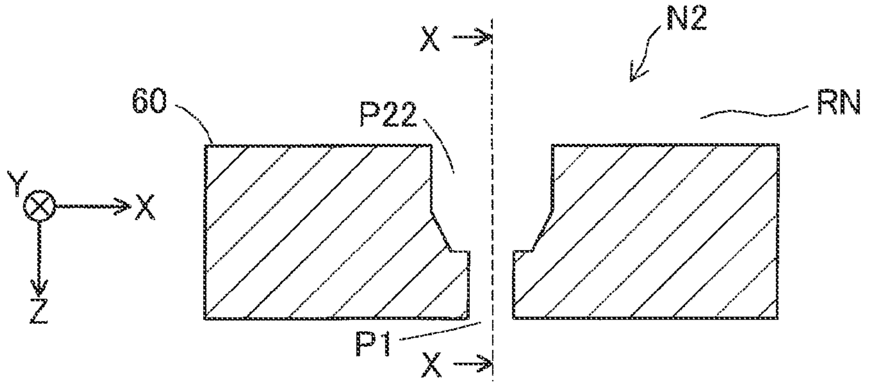
FIG. 9 is a diagram for explaining a nozzle according to another embodiment.
Figure 10:
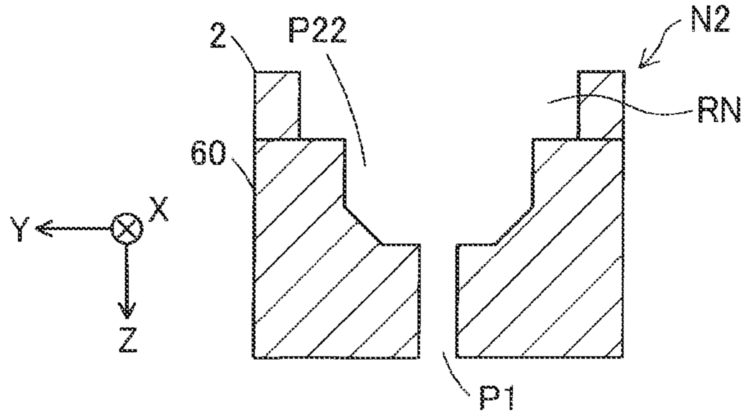
FIG. 10 is a diagram for explaining the nozzle according to another embodiment.

(C6) In the above embodiment, the second portion P2 may be chamfered or rounded at its end portion located at the side closer to the first portion P1. FIGS. 9 and 10 are diagrams for explaining a nozzle N2 according to another embodiment. FIG. 9 illustrates a cross section parallel to an X-Z plane of the nozzle N2. FIG. 10 illustrates a cross section taken along the line X-X of FIG. 9. As illustrated in FIGS. 9 and 10, chamfering the end portion, of a second portion P22, located at the side closer to the first portion P1 makes it possible to suppress pressure loss of liquid flowing in the +Z direction from the nozzle flow passage RN into the second portion P22, as compared with a non-chamfered structure. The processing is not limited to chamfering but may be rounding. The length L2 of the second portion P22 in this structure means the length in the X direction of its end portion located at the side closer to the nozzle flow passage RN.

Figure 11:
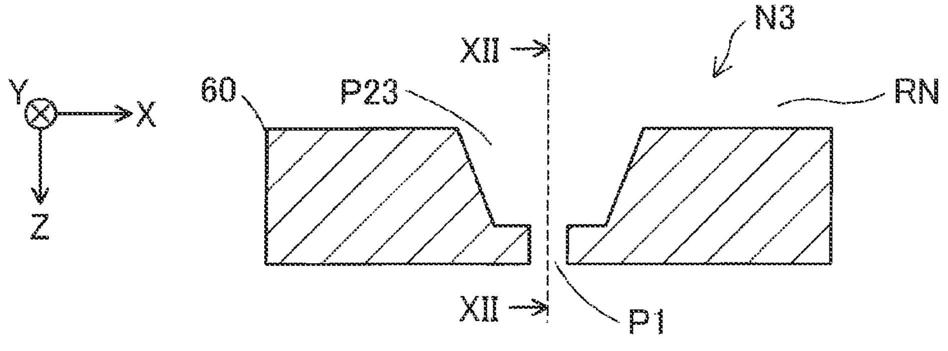
FIG. 11 is a diagram for explaining a nozzle according to another embodiment.
Figure 12:
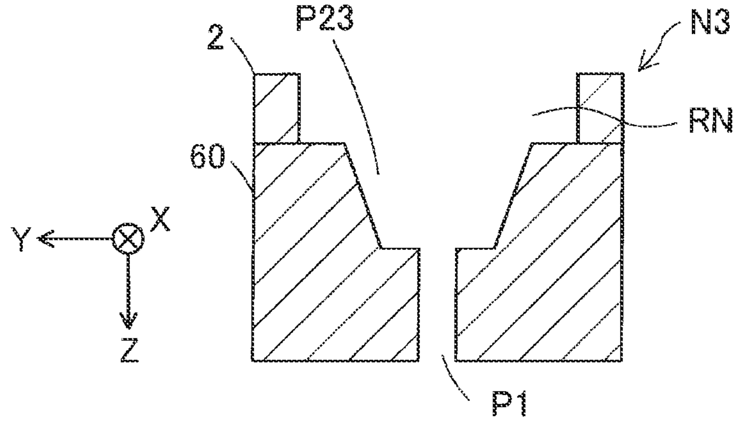
FIG. 12 is a diagram for explaining the nozzle according to another embodiment.

(C7) In the above embodiment, the second portion P2 may be tapered toward the side opposite to the nozzle flow passage RN in the Z direction. FIGS. 11 and 12 are diagrams for explaining a nozzle N3 according to another embodiment. FIG. 11 illustrates a cross section parallel to an X-Z plane of the nozzle N3. FIG. 12 illustrates a cross section taken along the line XII-XII of FIG. 11. As illustrated in FIGS. 11 and 12, tapering a second portion P23 toward the side opposite to the nozzle flow passage RN in the Z direction makes it possible to suppress pressure loss of liquid flowing in the +Z direction from the nozzle flow passage RN into the second portion P23, as compared with a non-tapered structure. The length L2 of the second portion P23 in this structure means the length in the X direction of its end portion located at the side closer to the nozzle flow passage RN.

Figure 13:
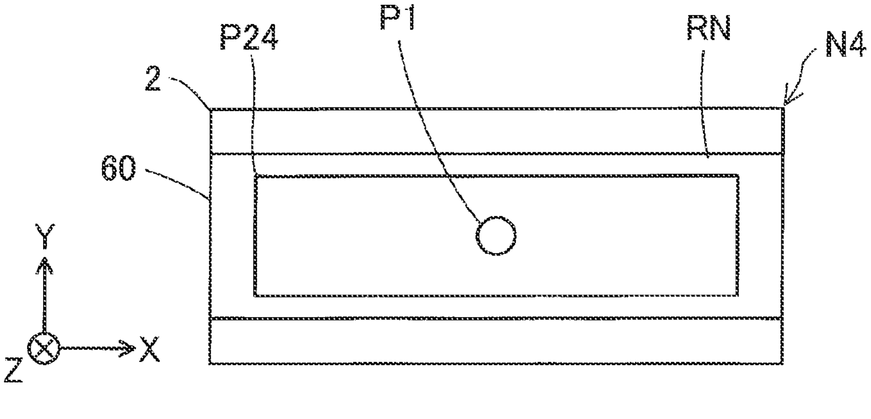
FIG. 13 is a diagram for explaining a nozzle according to another embodiment.

(C8) In the above embodiment, the second portion P2 may have a shape that looks like a rectangle when viewed in the Z direction. FIG. 13 is a diagram for explaining a nozzle N4 according to another embodiment. FIG. 13 is a Z-directional view of the nozzle N4. It is possible to make the capacity of the second portion P24 relatively large by configuring the second portion P24 in such a way as to have a shape that looks like a rectangle when viewed in the z direction as illustrated in FIG. 13.

(C9) In the above embodiment, the first portion P1 has a shape that looks like a circle when viewed in the Z direction. However, the scope of the present disclosure is not limited to this example. The first portion P1 may have any shape when viewed in the Z direction.

D. Other Modes

The scope of the present disclosure is not limited to the foregoing embodiments. The present disclosure may be modified in various ways within a range of not departing from its spirit. For example, technical features in the foregoing embodiments corresponding to technical features in each mode described in SUMMARY section of this specification may be replaced or combined in order to solve a part or a whole of problems described above or produce a part or a whole of effects described above. Some technical features may be deleted where unnecessary unless they are explained explicitly as indispensable in this specification.

(1) In a certain mode of the present disclosure, a liquid ejecting head is provided. The liquid ejecting head includes: a plurality of nozzles arranged in a Y direction and ejecting liquid in a Z direction intersecting with the Y direction; and a plurality of nozzle flow passages each being continuous to corresponding one of the plurality of nozzles and extending in an X direction intersecting with the Y direction and with the Z direction, wherein each of the plurality of nozzles includes a first portion and a second portion, the second portion being located closer to the nozzle flow passage in the Z direction than the first portion is, capacity of the first portion is smaller than capacity of the second portion, and $M2/M1<0.26$, where M1 is inertance of the first portion, and M2 is inertance of the second portion.

With the liquid ejecting head according to this mode, since the relation of $M2/M1<0.26$ is satisfied, relatively great oscillations of a meniscus occur when the liquid is ejected, and it is possible to greatly agitate the liquid inside the nozzle. By this means, it is possible to suppress an increase in the viscosity of the liquid inside the nozzle.

(2) In the liquid ejecting head according to the above mode, the following relation may be satisfied: $M2/M1<0.22$.

With the liquid ejecting head according to this mode, since the relation of $M2/M1<0.22$ is satisfied, as compared with a structure in which $M2/M1\geq0.22$ holds, a greater agitation of the liquid inside the second portion occurs when the liquid is ejected, and it is therefore possible to achieve a greater suppression of an increase in the viscosity of the liquid inside the nozzle.

(3) In the liquid ejecting head according to the above mode, the following relation may be satisfied: $M2/M1<0.16$.

With the liquid ejecting head according to this mode, since the relation of $M2/M1<0.16$ is satisfied, as compared with a structure in which M2/M1>0.16 holds, a greater agitation of the liquid inside the second portion occurs when the liquid is ejected, and it is therefore possible to achieve a greater suppression of an increase in the viscosity of the liquid inside the nozzle.

(4) In the liquid ejecting head according to the above mode, the following relation may be satisfied: M2/M1>0.005.

With the liquid ejecting head according to this mode, since the relation of M2/M1>0.005 is satisfied, as compared with a structure in which M2/M1≤0.005 holds, it is possible to suppress an excessive extending of a meniscus in the direction of ejection when the liquid is ejected and thus suppress unstable ejection of the liquid.

(5) In the liquid ejecting head according to the above mode, the following relation may be satisfied: M2/M1>0.007.

With the liquid ejecting head according to this mode, since the relation of M2/M1>0.007 is satisfied, as compared with a structure in which M2/M1≤0.007 holds, it is possible to suppress an excessive extending of a meniscus in the direction of ejection when the liquid is ejected and thus suppress unstable ejection of the liquid.

(6) In the liquid ejecting head according to the above mode, a length of the second portion in the X direction may be greater than a length of the first portion in the X direction.

With the liquid ejecting head according to this mode, since the length of the second portion in the X direction is greater than the length of the first portion in the X direction, as compared with a structure in which the length of the second portion is less than the length of the first portion, it is possible to make the region of contact of the second portion and the nozzle flow passage in the liquid flow direction larger, and it is therefore possible to improve the efficiency of ink supply and ink discharge between the second portion and the nozzle flow passage. By this means, it is possible to suppress an increase in the viscosity of the ink inside the nozzle.

(7) In the liquid ejecting head according to the above mode, a depth of the first portion in the Z direction may be less than a depth of the second portion in the Z direction.

With the liquid ejecting head according to this mode, since the depth of the first portion in the Z direction is less than the depth of the second portion in the Z direction, as compared with a structure in which the depth of the first portion in the Z direction is greater than the depth of the second portion in the Z direction, it is possible to suppress pressure loss of liquid inside the first portion and thus improve the performance of ejecting the liquid. Moreover, since it is possible to make the inertance of the first portion smaller, the liquid inside the first portion is easier to move, which makes the ejection of the liquid easier.

(8) In the liquid ejecting head according to the above mode, the following relations may be satisfied: M1>0.10, and M2>0.001.

With the liquid ejecting head according to this mode, since the relations of M1>0.10, and M2>0.001 are satisfied, as compared with a structure in which M1≤0.10 and M2≤0.001 hold, it is possible to configure the first portion to be relatively small and configure the second portion to be relatively large.

(9) The liquid ejecting head according to the above mode may further include: a common supply flow passage connected indirectly or directly to one end of the plurality of nozzle flow passages in a shared manner to supply the liquid to the nozzle flow passages; and a common discharge flow passage connected indirectly or directly to another end of the plurality of nozzle flow passages in a shared manner to discharge the liquid from the nozzle flow passages.

Since the liquid ejecting head according to this mode further includes the common supply flow passage and the common discharge flow passage, as compared with a structure in which the common supply flow passage and the common discharge flow passage are not provided, it is possible to circulate liquid inside the common supply flow passage and the common discharge flow passage and thus suppress the stagnation of the liquid.

(10) In the liquid ejecting head according to the above mode, the second portion may be circular when viewed in the Z direction.

With the liquid ejecting head according to this mode, since the second portion is circular when viewed in the Z direction, as compared with a structure in which the second portion is not circular, it is possible to suppress pressure loss of liquid flowing from the nozzle flow passage into the second portion.

(11) In the liquid ejecting head according to the above mode, the second portion may be chamfered or rounded at an end portion located at a side closer to the first portion.

With the liquid ejecting head according to this mode, since the second portion is chamfered or rounded at the end portion located at the side closer to the first portion, it is possible to suppress pressure loss of liquid flowing from the nozzle flow passage into the second portion, as compared with a non-chamfered or non-rounded structure.

(12) In the liquid ejecting head according to the above mode, the second portion may be tapered toward a side opposite to the nozzle flow passage in the Z direction.

With the liquid ejecting head according to this mode, since the second portion is tapered toward the side opposite to the nozzle flow passage in the Z direction, it is possible to suppress pressure loss of liquid flowing from the nozzle flow passage into the second portion, as compared with a non-tapered structure.

(13) In another mode of the present disclosure, a liquid ejecting apparatus is provided. The liquid ejecting apparatus includes: the liquid ejecting head according to the above mode; and a control unit that controls operation of ejecting the liquid from the liquid ejecting head.

The scope of application of the present disclosure is not limited to an ink-jet scheme; the present disclosure may be applied to a liquid ejecting apparatus configured to eject any kind of liquid other than ink, and a liquid ejecting head used in the liquid ejecting apparatus. For example, the present disclosure may be applied to the following various kinds of liquid ejecting apparatus and its liquid ejecting head:

(1) Image recording apparatus such as a facsimile apparatus or the like;
(2) Colorant ejecting apparatus used in color filter production for an image display device such as a liquid crystal display or the like;
(3) Electrode material ejecting apparatus used for forming electrodes of an organic EL (Electro Luminescence) display, a surface-emitting display (Field Emission Display, FED), or the like;
(4) Liquid ejecting apparatus for ejecting liquid containing a living organic material used in biochip fabrication;
(5) Sample ejecting apparatus as a high precision pipette;
(6) Lubricating oil ejecting apparatus;
(7) Liquid resin ejecting apparatus;
(8) Liquid ejecting apparatus for ejecting, with pinpoint accuracy, lubricating oil onto a precision device such as a watch, a camera, or the like;

(9) Liquid ejecting apparatus for ejecting transparent liquid resin such as ultraviolet ray curing resin or the like onto a substrate so as to form a micro hemispherical lens (optical lens) used in an optical communication element, or the like;

(10) Liquid ejecting apparatus for ejecting an acid etchant or an alkaline etchant for etching a substrate or the like;

(11) Liquid ejecting apparatus equipped with a liquid consumption head for ejecting any other micro-amount droplets.

The "liquid" may be any material that can be consumed by a liquid ejecting apparatus. For example, "liquid" may be any material that is in a liquid phase, including but not limited to: a material that is in a state of liquid having high viscosity or low viscosity, sol or gel water, other inorganic solvent or organic solvent, solution, liquid resin, and liquid metal (metal melt). In addition, not only a liquid as one state of a substance but also a liquid in which particles of a functional material formed of a solid substance such as pigments, metal particles, or the like are dissolved, dispersed, or mixed in a solvent are included in the "liquid". Typical examples of the "liquid" are as follows:

(1) Principal agent and curative agent of an adhesive;

(2) Base paint and dilution agent, clear paint and dilution agent;

(3) Principal dissolvent containing cells of cell ink and dilution agent;

(4) Metallic leaf pigment dispersion liquid and dilution agent of ink for a metallic gloss finish (metallic ink);

(5) Gasoline, light oil, and bio-based fuel for vehicles;

(6) Principal ingredient and protective ingredient of a medicine;

(7) Fluorescent substance and sealant of a light-emitting diode (LED).

What is claimed is:

1. A liquid ejecting head, comprising:

a plurality of nozzles arranged in a Y direction and ejecting liquid in a Z direction intersecting with the Y direction; and a plurality of nozzle flow passages each being continuous to corresponding one of the plurality of nozzles and extending in an X direction intersecting with the Y direction and with the Z direction, wherein each of the plurality of nozzles includes a first portion and a second portion, the second portion being located closer to the nozzle flow passage in the Z direction than the first portion is, capacity of the first portion is smaller than capacity of the second portion, and $M2/M1<0.26$, where M1 is inertance of the first portion, and M2 is inertance of the second portion.

2. The liquid ejecting head according to claim 1, wherein $M2/M1<0.22$.

3. The liquid ejecting head according to claim 2, wherein $M2/M1<0.16$.

4. The liquid ejecting head according to claim 1, wherein $M2/M1>0.005$.

5. The liquid ejecting head according to claim 4, wherein $M2/M1>0.007$.

6. The liquid ejecting head according to claim 1, wherein a length of the second portion in the X direction is greater than a length of the first portion in the X direction.

7. The liquid ejecting head according to claim 1, wherein a depth of the first portion in the Z direction is less than a depth of the second portion in the Z direction.

8. The liquid ejecting head according to claim 1, wherein $M1>0.10$, and $M2>0.001$.

9. The liquid ejecting head according to claim 1, further comprising:

a common supply flow passage connected indirectly or directly to one end of the plurality of nozzle flow passages in a shared manner to supply the liquid to the nozzle flow passages; and a common discharge flow passage connected indirectly or directly to another end of the plurality of nozzle flow passages in a shared manner to discharge the liquid from the nozzle flow passages.

10. The liquid ejecting head according to claim 1, wherein the second portion is circular when viewed in the Z direction.

11. The liquid ejecting head according to claim 1, wherein the second portion is chamfered or rounded at an end portion located at a side closer to the first portion.

12. The liquid ejecting head according to claim 1, wherein the second portion is tapered toward a side opposite to the nozzle flow passage in the Z direction.

13. A liquid ejecting apparatus, comprising:

the liquid ejecting head according to claim 1; and a control unit that controls operation of ejecting the liquid from the liquid ejecting head.

* * * * *